(12) United States Patent
Welchko et al.

(10) Patent No.: US 7,432,683 B2
(45) Date of Patent: Oct. 7, 2008

(54) PWM PATTERN SEQUENCE TO REDUCE LOSSES IN VOLTAGE SOURCE INVERTERS

(75) Inventors: Brian Welchko, Torrance, CA (US);
Steven E. Schulz, Torrance, CA (US);
Silva Hiti, Redondo Beach, CA (US);
Stephen T. West, New Palestine, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 143 days.

(21) Appl. No.: 11/561,513

(22) Filed: Nov. 20, 2006

(65) Prior Publication Data

US 2008/0116840 A1 May 22, 2008

(51) Int. Cl.
*H02P 5/34* (2006.01)
(52) U.S. Cl. .................. 318/802; 318/801; 318/806; 318/808
(58) Field of Classification Search ............. 318/245, 318/254, 439, 800, 801–812
See application file for complete search history.

(56) References Cited

U.S. PATENT DOCUMENTS

| 5,483,140 | A | * | 1/1996 | Hess et al. | 318/802 |
| 5,550,450 | A | * | 8/1996 | Palko et al. | 318/800 |
| 5,821,722 | A | * | 10/1998 | Forbes et al. | 318/696 |
| 6,356,048 | B1 | * | 3/2002 | Zenoni et al. | 318/806 |
| 6,392,418 | B1 | * | 5/2002 | Mir et al. | 324/503 |

* cited by examiner

*Primary Examiner*—Paul Ip

(57) ABSTRACT

A method for controlling an inverter uses sequences of predetermined states where each state uniquely corresponding to a set of control signals provided to the inverter that is coupled to a motor. The method includes repeatedly applying a first center null timing sequence of the states while monitoring a zero crossing condition and then changing the repeated application of the first center null timing sequence of the states into a repeated application of a second center null timing sequence of states when the monitoring detects a zero crossing condition. The repeated application of the first center null timing sequence sequentially provides the inverter with a first predetermined sequence of sets of control signals. The monitoring of a zero crossing condition monitors for a zero crossing condition in an electrical current flowing between the inverter and a terminal of the motor. The second center null timing sequence defines a second predetermined sequence of sets of control signals.

6 Claims, 6 Drawing Sheets

PWM PATTERN SEQUENCE TO REDUCE LOSSES IN VOLTAGE SOURCE INVERTERS

BACKGROUND OF THE INVENTION

Description of Related Art

FIG. 1 depicts a known inverter coupled to a controller of a novel design as discussed herein. The inverter includes six switches AU, BU, CU, AL, BL and CL capable of controlling the flow of electric power to and from an ac motor. These switches are under control of a controller that generates six control signals CAU, CBU, CCU, CAL, CBL and CCL to control the corresponding six switches AU, BU, CU, AL, BL and CL.

The controller described herein is of a novel design, and to describe the novel controller, a space vector diagram is used herein. The concept of describing functions of controllers using a space vector diagrams was described by M. Hava, R. J. Kerkman, and T. A. Lipo, "Simple analytical and graphical methods for carrier-based PWM-VSI drives," *IEEE Trans. Power Electronics*, vol. 14, no. 1, pp. 49-61, Jan. 1999, which may be of help understanding the use of the space vector diagram.

SUMMARY OF THE INVENTION

A method for controlling an inverter uses sequences of predetermined states where each state uniquely corresponding to a set of control signals provided to the inverter that is coupled to a motor. The method includes repeatedly applying a first center null timing sequence of the states while monitoring a zero crossing condition and then changing the repeated application of the first center null timing sequence of the states into a repeated application of a second center null timing sequence of states when the monitoring detects a zero crossing condition. The repeated application of the first center null timing sequence sequentially provides the inverter with a first predetermined sequence of sets of control signals. The monitoring of a zero crossing condition monitors for a zero crossing condition in an electrical current flowing between the inverter and a terminal of the motor. The second center null timing sequence defines a second predetermined sequence of sets of control signals.

A machine-readable medium includes sets of instructions operable in a controller for controlling an inverter that uses sequences of predetermined states where each state uniquely corresponds to a set of control signals provided to the inverter that is coupled to a motor. The sets of instructions are operable to cause a processor in the controller to perform specific operations including repeatedly applying a first center null timing sequence of the states to sequentially provide to the inverter a first predetermined sequence of sets of control signals. Also among these specific operations are instructions to monitor a zero crossing condition in an electrical current flowing between the inverter and the phase b terminal of the motor. Further found among the specific operations is changing the repeated application of the first center null timing sequence into a repeated application of a second center null timing sequence of states when the monitoring detects a zero crossing condition where the second center null timing sequence defining a second predetermined sequence of sets of control signals.

BRIEF DESCRIPTION OF DRAWINGS

The invention will be described in detail in the following description of preferred embodiments with reference to the following figures.

FIG. 6 is a set of four graphs illustrating four possible timing sequences for switching between the states $V_0$, $V_3$, $V_4$ and $V_7$ of FIG. 3 in a way analogous to the way illustrated in FIG. 4 and to achieve the same ends but within sector 3.

FIG. 7 is a set of four graphs illustrating four possible timing sequences for switching between the states $V_0$, $V_4$, $V_5$ and $V_7$ of FIG. 3 in a way analogous to the way illustrated in FIG. 4 and to achieve the same ends but within sector 4.

DETAILED DESCRIPTION OF PREFERRED EMBODIMENTS

Figure 3:
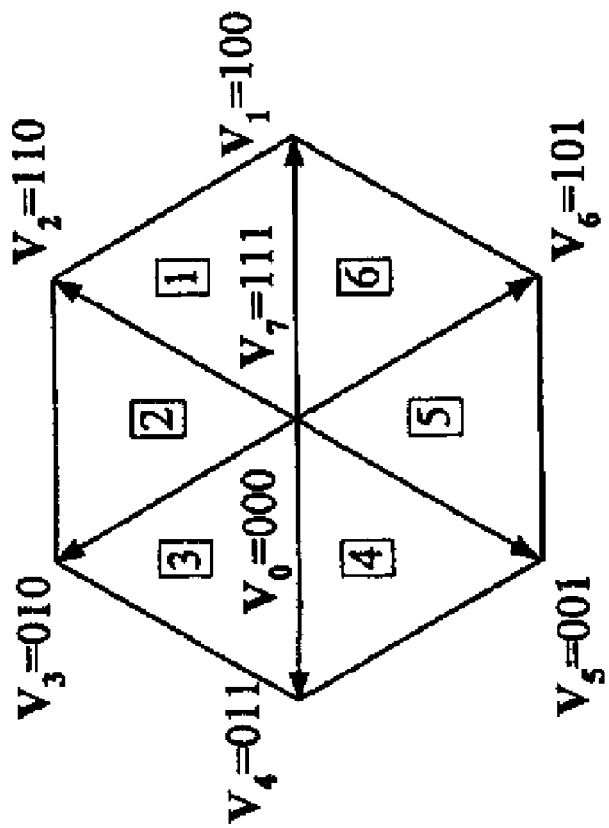
FIG. 3 is a space vector diagram, a graph illustrating the discrete states $V_0$ through $V_7$, for switch positions that define sectors 1 through 6 and that are used to apply voltages to the motor in FIG. 1 in order to mechanize pulse width modulation (PWM) and achieve an equivalent to the ideal voltage illustrated in FIG. 2 (i.e., the commanded voltage vector).

FIG. 3 depicts a vector space diagram. The vertices and the center of the vector space diagram illustrate the settings for each switch in the inverter illustrated in FIG. 1 for each of eight states denoted $V_0$ through $V_7$. Three binary numbers define each state, $V_0$ through $V_7$. Each binary number corresponds to a particular motor phase, i.e., a, b or c. A binary number of "1" represents a condition where the upper switch of the inverter phase is closed and lower switch is open, but a "0" represents a condition where the upper switch of the inverter phase is open and lower switch is closed. For example, in state $V_0$ all of the upper switches maintain the motor disconnected from the upper voltage bus, and all of the lower switches maintain the motor connected to the lower voltage bus. Similarly, in state $V_7$ all of the upper switches maintain the motor connected to the upper voltage bus, and all of the lower switches maintain the motor disconnected from the lower voltage bus. States $V_0$ and $V_7$ provide zero voltage to the motor.

In state $V_1$ (100), motor phase a is connected to the upper voltage bus while being disconnected from the lower voltage bus, but phases b and c are each disconnected from the upper voltage bus while being connected to the lower voltage bus. Similarly, in state $V_2$ (110), motor phases a and b are both connected to the upper voltage bus while being disconnected from the lower voltage bus, but phase c is disconnected from the upper voltage bus while being connected to the lower voltage bus. The same pattern repeats and can be used to interpret the switch settings for each of the remaining states $V_3$ through $V_6$.

Figure 4:
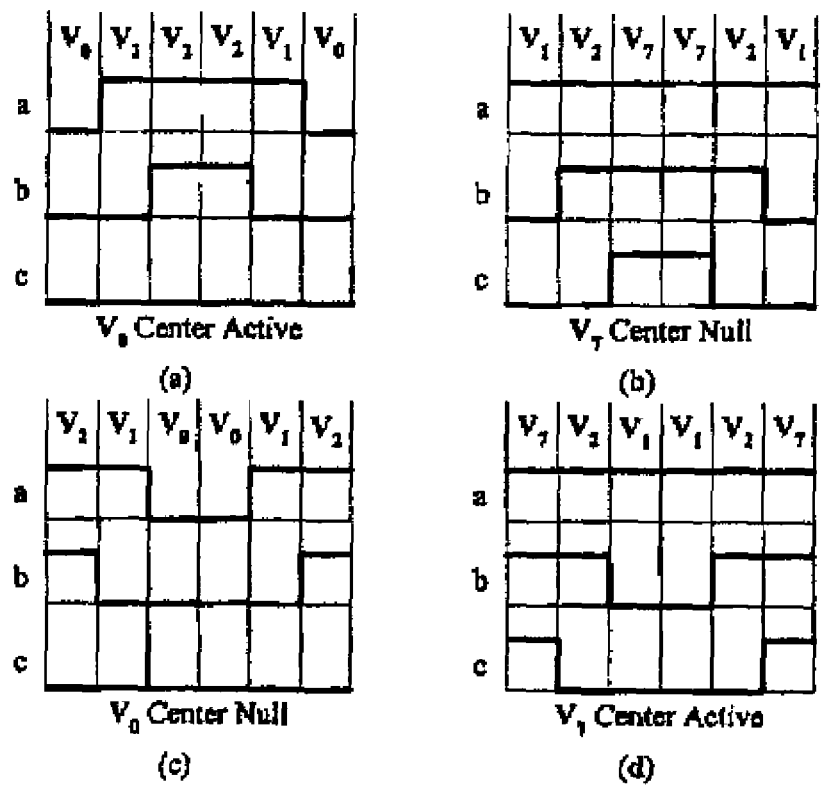
FIG. 4 is a set of four graphs illustrating four possible timing sequences for switching between the states $V_0$, $V_1$, $V_2$ and $V_7$ of FIG. 3 in such a way that only one switch is turned on or off at a time, one switch is not switched during the PWM cycle, and the switching pattern is symmetric to the center of the period. Furthermore, the upper and lower switches do not provide a direct current path between the upper and lower voltage busses without passing through the motor of FIG. 1, and dwell times at each state may be adjusted to achieve an equivalent to any ideal voltage illustrated in FIG. 2 within sector 1.

In FIG. 4, four possible timing sequences are illustrated for switching between the states $V_0$, $V_1$, $V_2$ and $V_7$ of FIG. 3 in such a way that only one switch is turned on or off at a time, one switch is not switched during the PWM cycle, and the switching pattern is symmetric to the center of the period. Furthermore, the upper and lower switches do not provide a direct current path between the upper and lower voltage busses without passing through the motor of FIG. 1, and dwell times at each state may be adjusted to achieve an equivalent to any ideal voltage illustrated in FIG. 2 within sector 1.

The first timing sequence (a) is labeled $V_0$ center active, the second timing sequence (b) is labeled $V_7$ center null, the third timing sequence (c) is labeled $V_0$ center null, and the fourth timing sequence (d) is labeled $V_7$ center active. These labels are just convenient names to help illustrate the invention. The label "center active" is used here to mean that the switch states during the center four timing intervals (as shown in FIGS. 4-9) are such that different voltages are applied across the terminals of the motor during the center four timing intervals. Thus, the term active means actively driving the motor. Note that during the first and last timing intervals in the "center active" timing sequences, the switch states are such that the voltage applied to all of the terminals of the motor is either the voltage on the upper voltage bus or the voltage on the lower voltage bus. Thus, the motor is not actively driven during the first and last timing intervals of the "center active" timing sequence. This condition could easily be referred to as "edge null."

Similarly, the label "center null" is used here to mean that the switch states during the center two timing intervals are such that the voltages applied to all of the terminals of the motor are either the voltage on the upper voltage bus or the voltage on the lower voltage bus. Thus, the motor is not actively driven during the center two timing intervals of the "center null" timing sequence. Note that during the first and last pair of timing intervals in the "center null" timing sequences, the switch states are such that different voltages are applied across the terminals of the motor during the first and last pair of timing intervals. Thus, the motor is actively driven during the first and last pair of timing intervals of the "center null" timing sequence.

Figure 1:
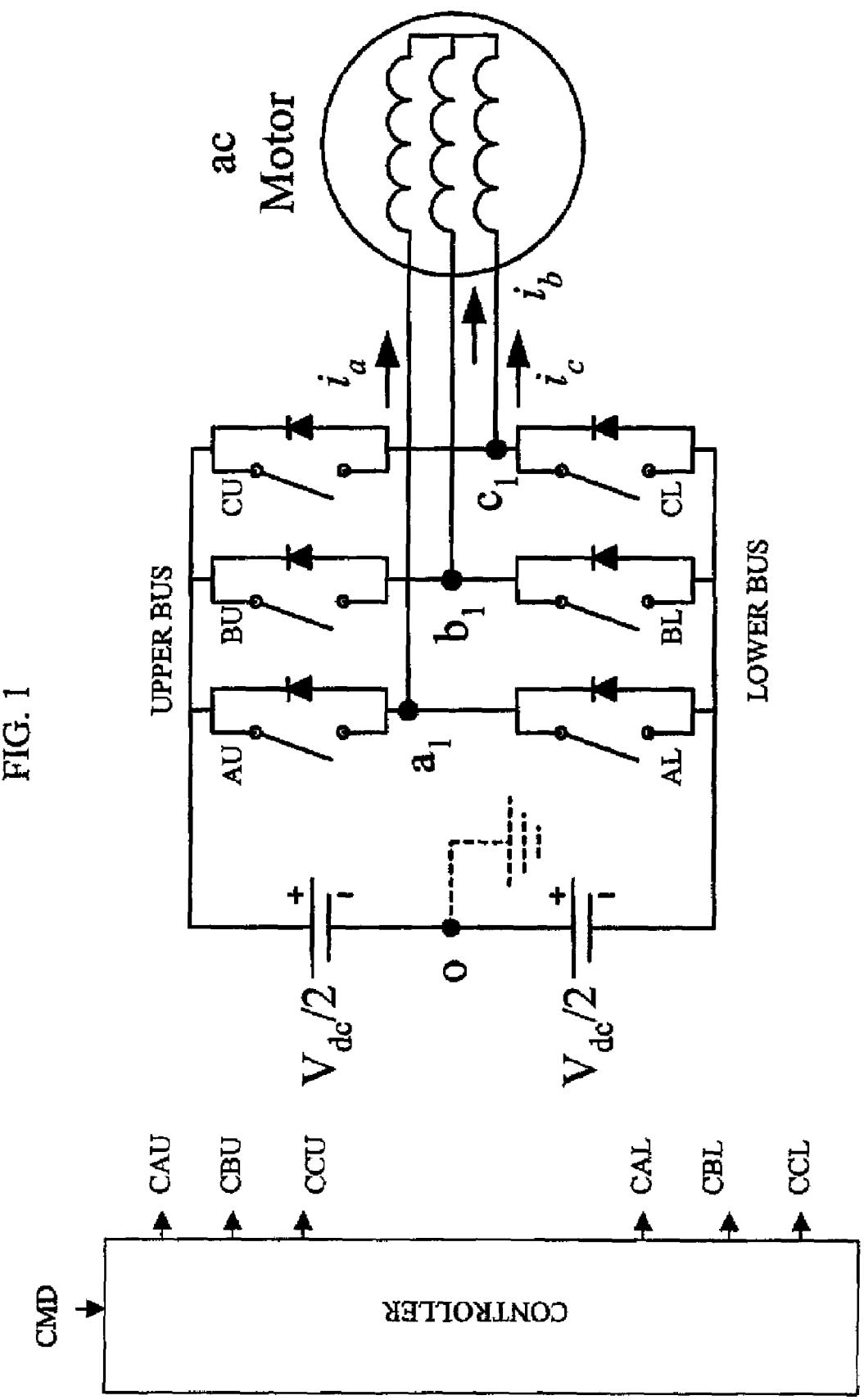
FIG. 1 is a schematic drawing of a controller, an inverter and a motor according to an embodiment of the invention.
Figure 2:
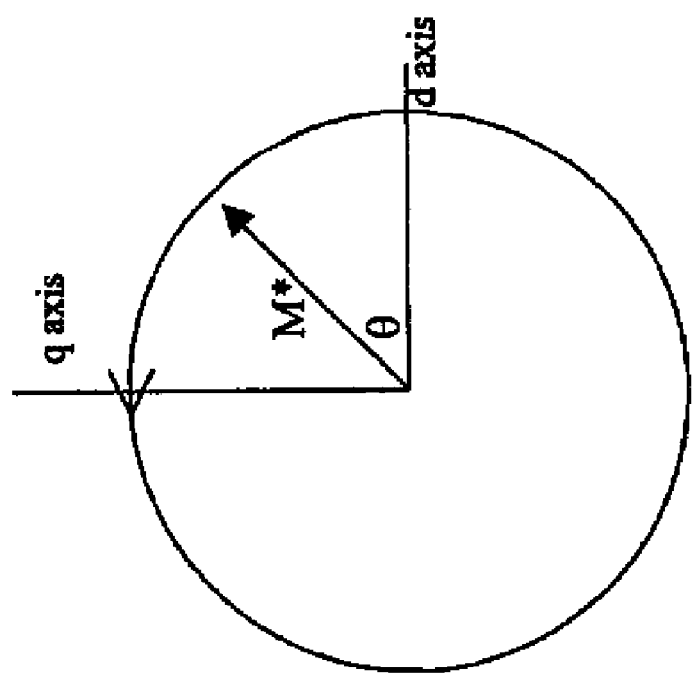
FIG. 2 is a graph in polar coordinates illustrating an ideal voltage to be applied to the motor in FIG. 1, often referred to as the commanded voltage vector, to respond to the command provided to the controller in FIG. 1.

By repeatedly executing any one of the four timing sequences illustrated in FIG. 4, it is possible to integrate currents in the windings of the motor illustrated in FIG. 1 in such a way as to be equivalent to providing the motor with any ideal voltage illustrated in FIG. 2 within sector 1 (see FIG. 3). The particular phase and magnitude of this equivalent voltage depends on the relative dwell periods in which the switches are in any particular state. If the repeat interval is short (i.e., rapidly repeating), then the ripple on top of the integrated equivalent voltage is small, but inefficiencies due to switching times of the switches of the inverter may become significant. However, if the repeat interval is longer (i.e., less rapidly repeating), then the ripple on top of the integrated equivalent voltage is larger, and the inefficiencies due to switching times of the switches of the inverter become less significant. For illustration purposes, assume a typical repeat interval of 100 microseconds (10 kHz) will balance the factors of ripple and switching efficiencies in a desired way. Then, the dwell periods for each of states in any of the timing sequences illustrated in FIG. 4 become a fractional part of the 100 microsecond repeat interval so that all dwell periods in a sequence add up to the 100 microsecond repeat interval.

Figure 10:
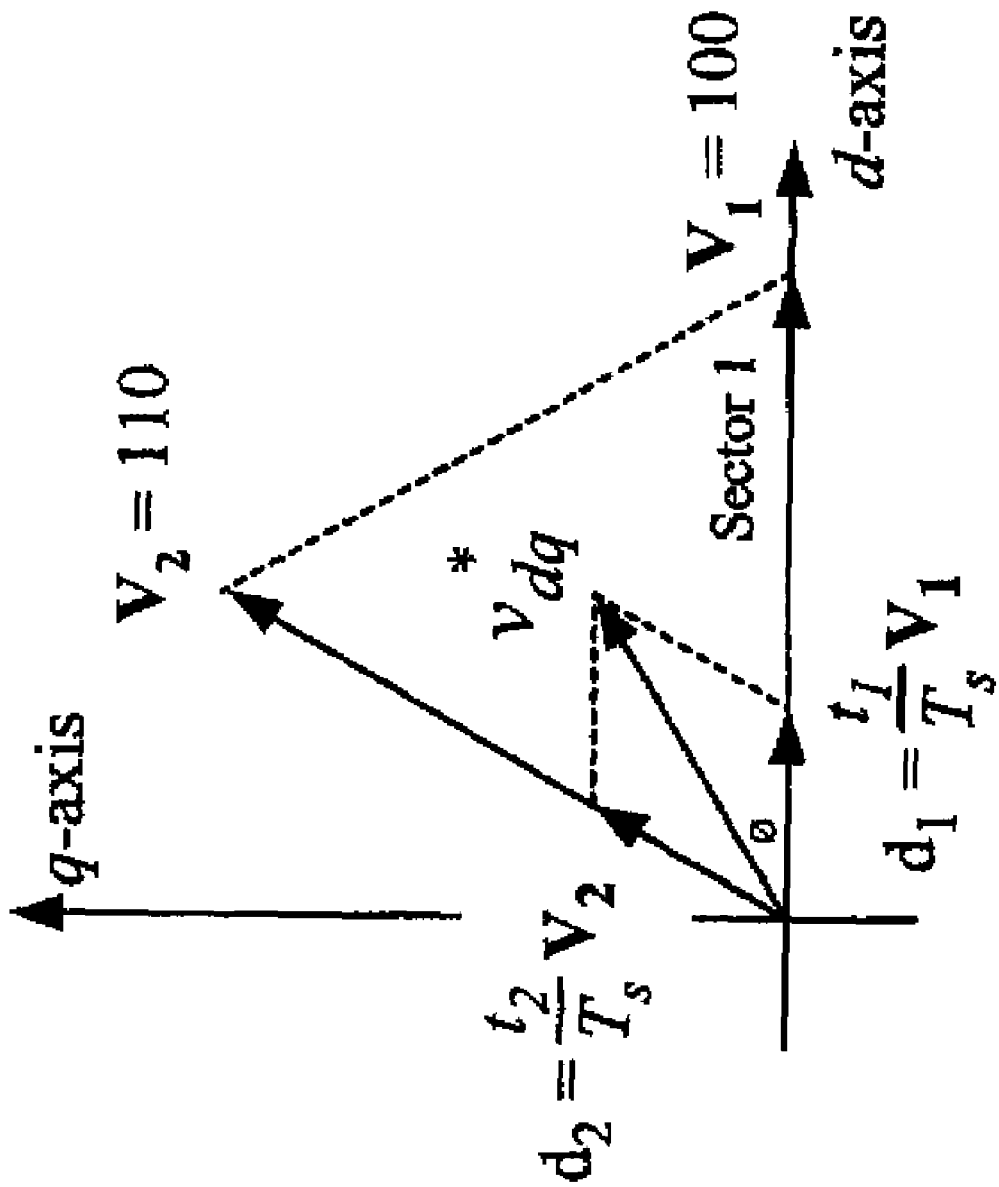
FIG. 10 is a space vector diagram illustrating how duty cycles of state vectors can be determined within sector 1.

The actual duty cycles of the three space vectors (e.g., $V_1$, $V_2$ and $V_7$ as used in timing sequence (b) of FIG. 4) employed over any DPWM (discontinuous PWM) timing sequence repeat interval can be determined from the space vector diagram. FIG. 10 illustrates the principle when the commanded output voltage vector is in sector 1 and $M_i^*$ is the commanded modulation index of the output voltage and $\theta$ is the angular position of the output voltage vector. In timing sequence (b) of FIG. 4, for example, $V_1$ and $V_2$ are referred to as the active voltage vectors since these voltage vectors apply voltages across phases of the motor, and $V_7$ is referred to as a zero voltage vector since this voltage vector causes the voltage across all phases of the motor to be short circuited together. From the space vector diagram, the duty cycles of the two active space vectors can be found from equations (1) through (3) as follows.

$$d_1 = \frac{2\sqrt{3}}{\pi} M_i^* \sin\left(\frac{\pi}{3} - \theta\right) \quad (1)$$

$$d_2 = \frac{2\sqrt{3}}{\pi} M_i^* \sin(\theta) \quad (2)$$

$$d_z = 1 - d_1 - d_2 \quad (3)$$

Once the duty cycles of the active voltage vectors (e.g., $V_1$ and $V_2$ as used in any timing sequence of FIG. 4) and zero voltage vector (e.g., $V_7$ as used in timing sequence (b) of FIG. 4 and $V_0$ as used in timing sequence (c) of FIG. 4) are determined from equations (1) through (3), one of the pulse sequences as illustrated in FIG. 4 are implemented by the controller with $d_z$ indicating the duty cycle of the zero vector (either $V_0$ or $V_7$) and $d_1$ and $d_2$ indicating the duty cycles of the two active vectors. Equations (1) through (3) also correspond to sectors two through six after proper rotation to account for the angle $\theta$ and corresponding active vectors for the given sector. Which zero vector (either $V_0$ or $V_7$) is employed is a characteristic of the DPWM modulation method independent of the pulse sequence determination.

Referring again to FIG. 1, the controller translates the command CMD (containing the commanded modulation index $M_i^*$ and the angular position of the commanded output voltage vector $\theta$) into the control signals CAU, CAL, CBU, CBL, CCU and CCL that drive the switches in the inverter. For example, when the controller is in state $V_1$ (100), CAU commands the upper transistor of the a phase to be on, and CAL commands the lower transistor of the a phase to be off. Furthermore, CBU and CCU command the upper transistors of the b and c phases to be off, and CBL and CCL command the lower transistors of the b and c phases to be on. The length of time in which the controller stays in state $V_1$ (100) is defined by equations (1) through (3).

Similarly, when the controller is in state $V_2$ (110), CAU and CBU command the upper transistors of the a and b phases to be on, and CAL and CBL command the lower transistors of the a and b phases to be off. Furthermore, CCU commands the upper transistor of the c phase to be off, and CCL commands the lower transistor of the c phase to be on. The length of time in which the controller stays in state $V_2$ (110) is defined by equations (1) through (3).

In a similar way, the controller generates the control signals CAU, CAL, CBU, CBL, CCU and CCL with values that correspond to each of the vector states and for the dwell times determined according to equations (1) through (3) based on the command CMD.

Any of the four timing sequences illustrated in FIG. 4 can be used to produce a desired commanded voltage vector within sector 1 (see FIG. 3). Any of the four timing sequences illustrated in FIG. 5 can be used to produce a desired commanded voltage vector within sector 2 (see FIG. 3). Any of the four timing sequences illustrated in FIG. 6 can be used to produce a desired commanded voltage vector within sector 3 (see FIG. 3). Any of the four timing sequences illustrated in FIG. 7 can be used to produce a desired commanded voltage vector within sector 4 (see FIG. 3). Any of the four timing sequences illustrated in FIG. 8 can be used to produce a desired commanded voltage vector within sector 5 (see FIG. 3). Any of the four timing sequences illustrated in FIG. 9 can be used to produce a desired commanded voltage vector within sector 6 (see FIG. 3).

The controller, responsive to command CMD, generates control signals CAU, CAL, CBU, CBL, CCU and CCL to produce a rotating commanded voltage vector at the desired angular rotation rate and at the desired magnitude (refer again to FIG. 2). To do so, the controller selects which one of the four possible timing sequences to use in generating the desired commanded voltage vector during in timing sequence repeat interval (e.g., 100 microseconds in this example). The rotating commanded voltage vector rotates the motor, but the actual currents drawn by the three phase terminals a, b, c of the motor may lead or lag the angular position of the voltage vector due to various factors including motor losses and torque accelerations and/or decelerations.

The controller uses center null sequences for driving the inverter, and selects from among the available two center null timing sequences (in each sector). Initially, the controller repeatedly applied a first center null timing sequence (e.g., timing sequence (b) of FIG. 4) of the states (e.g., $V_1$, $V_2$ and $V_7$) to sequentially provide to the invert a first predetermined sequence of sets of control signals (e.g., CAU, CAL, CBU, CBL, CCU and CCL). The dwell times may be computed for each state of the first center null timing sequence based on an input command (containing the commanded modulation index $M_i^+$ and the angular position of the commanded output voltage vector θ) as discussed above.

The controller monitors the electrical currents flowing between the inverter and terminals of the motor for a zero crossing condition in an electrical current. Alternatively, the monitoring may be done by other systems and simply reported to the controller as a digital or analog signal. Either case shall be regarded as monitoring for a zero crossing condition.

Figure 5:
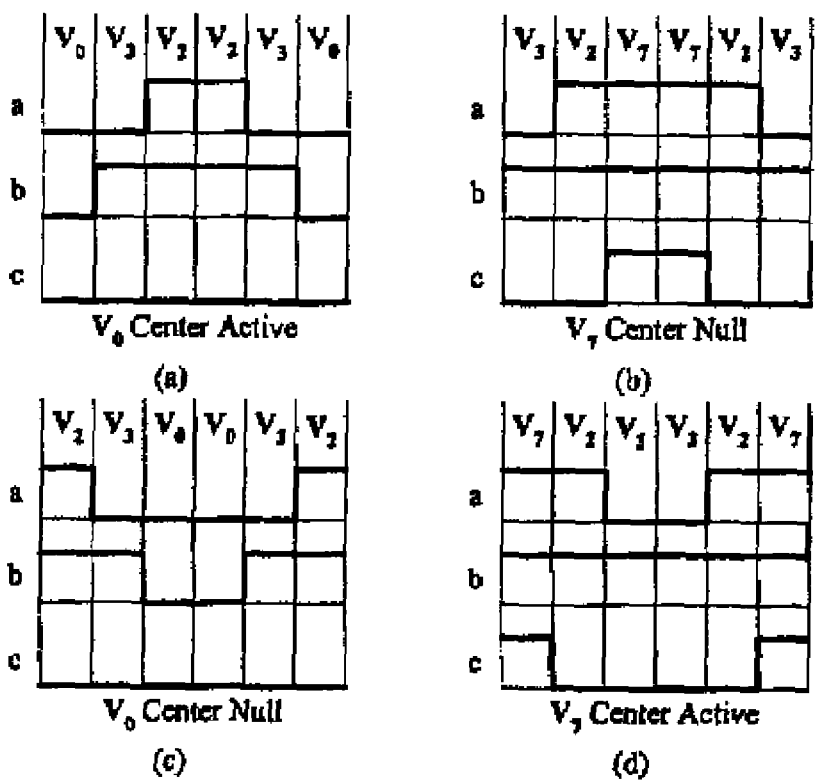
FIG. 5 is a set of four graphs illustrating four possible timing sequences for switching between the states $V_0$, $V_2$, $V_3$ and $V_7$ of FIG. 3 in a way analogous to the way illustrated in FIG. 4 and to achieve the same ends but within sector 2.

The controller changes the repeated application of the first center null timing sequence (in this example, sequence (b) of FIG. 4). into a repeated application of a second center null timing sequence (e.g., sequence (c) in FIG. 5) of states when the monitoring detects a zero crossing condition at or near sector boundaries. When electrical current waveforms neither lead nor lag the commanded voltage vector, the zero crossing of one of the phases will occur at the boundary between sectors. Lead or lag power factors will tend to advance or retard the zero crossing condition. In the present invention, only center null timing sequences are used, and the changeover from the first to the second center null timing sequence occurs at or near the zero crossing condition for an electrical current flowing between the inverter and a terminal of the motor.

As a separate condition, the present invention may alternate between two available inactive states used in adjacent repeated applications of null centered timing sequences. Only one inactive state, whether it is state $V_0$ or state $V_7$, is used in each timing sequence. For example, the controller changes the repeated application of timing sequence (b) of FIG. 4 (in this example, the first center null timing sequence using state $V_7$ as the inactive state) into a repeated application of timing sequence (c) in FIG. 5 (in this example, the second center null timing sequence using state $V_0$ as the inactive state) when the monitoring detects a zero crossing condition at or near sector boundary between sector 1 and sector 2 (see FIG. 3). As the commanded voltage vector rotates counter clockwise (see FIG. 2), it successively progresses from sector 1, to sector 2, to sector 3, to sector 4, to sector 5, to sector 6 and back again to sector 1 (see FIG. 3).

Figures 6, 7:
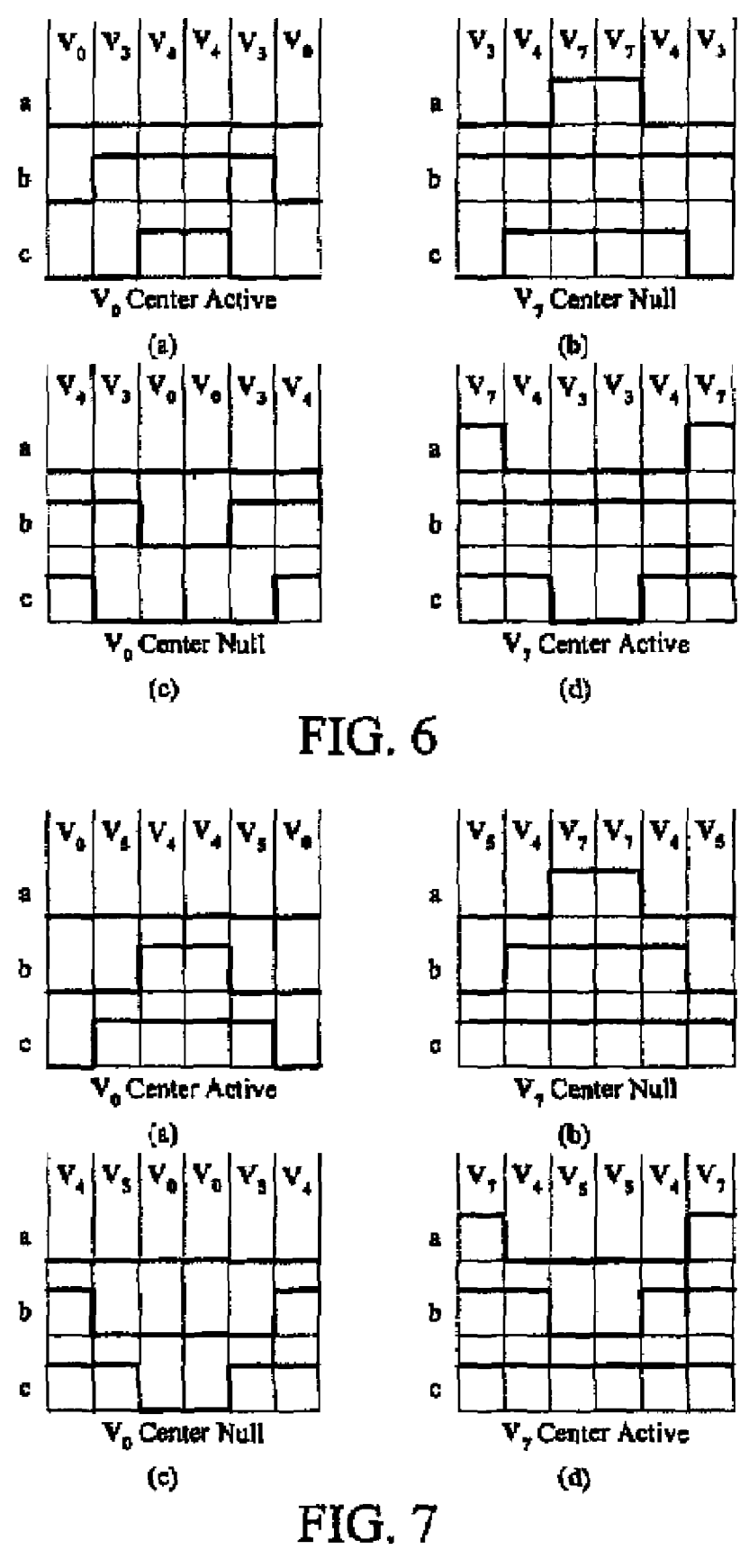
Figure 8:
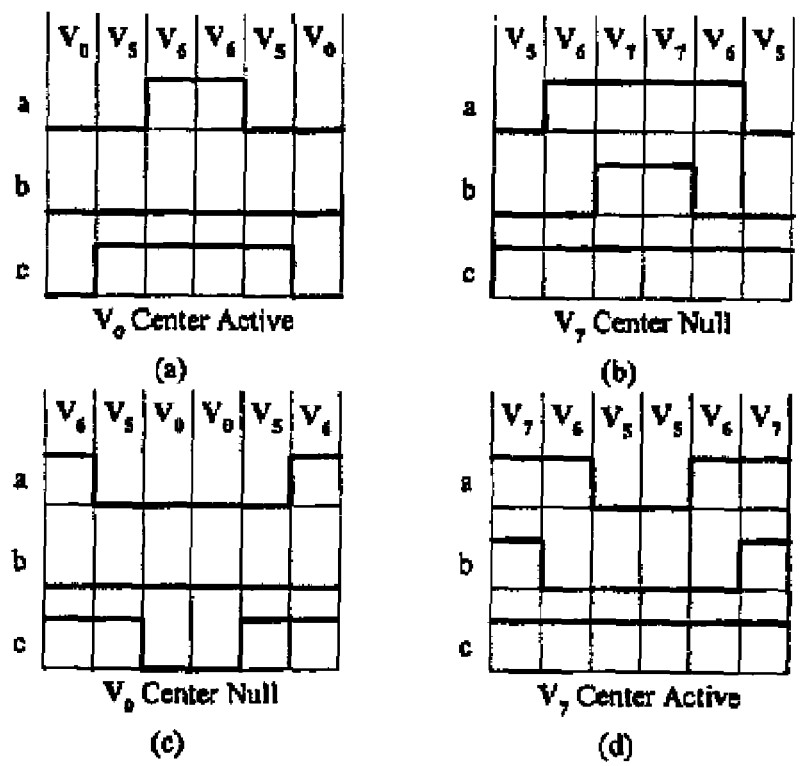
FIG. 8 is a set of four graphs illustrating four possible timing sequences for switching between the states $V_0$, $V_5$, $V_6$ and $V_7$ of FIG. 3 in a way analogous to the way illustrated in FIG. 4 and to achieve the same ends but within sector 5.
Figure 9:
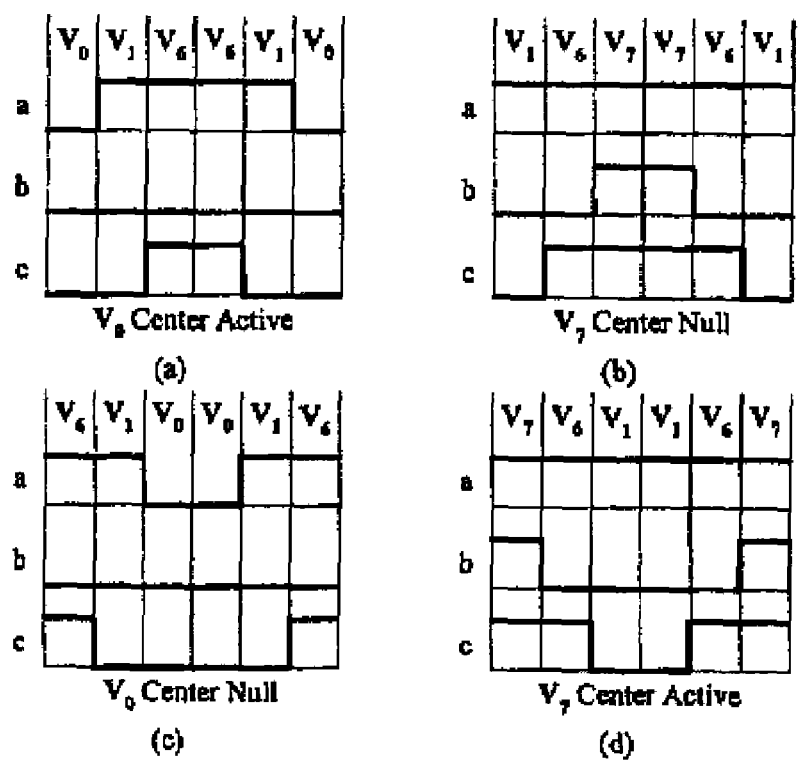
FIG. 9 is a set of four graphs illustrating four possible timing sequences for switching between the states $V_0$, $V_1$, $V_6$ and $V_7$ of FIG. 3 in a way analogous to the way illustrated in FIG. 4 and to achieve the same ends but within sector 6.

In an embodiment of this invention, the timing sequences used would be timing sequence (b) of FIG. 4, followed by timing sequence (c) of FIG. 5, followed by timing sequence (b) of FIG. 6, followed by timing sequence (c) of FIG. 7, followed by timing sequence (b) of FIG. 8, followed by timing sequence (c) of FIG. 9, and then followed again by timing sequence (b) of FIG. 4. All such timing sequences are center null and this progression of timing sequences alternates between using state $V_0$ and state $V_7$ as the inactive state vector. Furthermore, the transitions between timing sequences in this progression occurs at or near the zero crossing condition for an electrical current flowing between the inverter and a terminal of the motor.

In an alternative embodiment of this invention, the timing sequences used would be timing sequence (c) of FIG. 4, followed by timing sequence (b) of FIG. 5, followed by timing sequence (c) of FIG. 6, followed by timing sequence (b) of FIG. 7, followed by timing sequence (c) of FIG. 8, followed by timing sequence (b) of FIG. 9, and then followed again by timing sequence (c) of FIG. 4. All such timing sequences are center null and this progression of timing sequences alternates between using state $V_0$ and state $V_7$ as the inactive state vector. Similarly to other embodiments, the transitions between timing sequences in this progression occurs at or near the zero crossing condition for an electrical current flowing between the inverter and a terminal of the motor.

Note carefully that in the above described progressions of center null timing sequences, only one phase is switched at the edges of the timing sequences when the controller changes from a prior timing sequence to a new timing sequences, and that phase is the same phase that goes though a zero crossing condition at or near the sector (or 60° section) boundaries.

Therefore, two important benefits are achieved. First, when a repeated application of a first center null timing sequence is changed to a repeated application of a second center null timing sequence (for an adjacent sector or 60° section), the switch (i.e., transistor) in the inverter that is changed at the zero crossing condition (i.e., when any one of the currents flowing between the motor and the inverter has a zero crossing) is the same switch that has the zero crossing condition. In this way, the switch does not conduct significant current during the time the switch is changed from conducting to non-conducting, thus extending the life of the switches. Second, by alternating between state $V_0$ and state $V_7$ as the inactive state vector, no switch in the inverter is maintained constantly on which helps the thermal stresses to be shared equally among all six switches.

The controller is typically a microprocessor, but may be mechanized out of discrete electronic components, application specific integrated circuits (ASIC), programmable gate arrays (PGAs), or the like, where the control of the method or of the operations of the controller is controlled by a microprogram stored in a computer readable medium such as a RAM, ROM or the like, stored in the mask patterns and wirings of an integrated circuit or stored in the wiring patterns and circuit connections of the electronic components.

In a first example, a method controls an inverter (e.g., as depicted in FIG. 1) using sequences of predetermined states (e.g., vector voltages $V_0$ through $V_7$ as depicted in FIG. 3 and as discussed above) where each state uniquely corresponding to a set of control signals (e.g., CAU, CAL, CBU, CBL, CCU and CCL carrying values corresponding to state values "000" through "111" as discussed above) provided to the inverter that is coupled to a motor. The method includes repeatedly applying a first center null timing sequence (e.g., (b) in FIG. 4) of the states, monitoring a zero crossing condition (e.g., when zero or nearly zero current is flowing between the inverter and the b phase of the motor) and changing the repeated application of the first center null timing sequence (e.g., (b) in FIG. 4) of the states into a repeated application of a second center null timing sequence (e.g., (c) in FIG. 5) of states when the monitoring detects a zero crossing condition in phase b. Note that phase b is the only phase switching at this time, and it is phase b that is monitored for zero crossing. The repeated application of the first center null timing sequence sequentially provides the inverter with a first predetermined sequence (e.g., (b) in FIG. 4) of sets of control signals (e.g., CAU, CAL, CBU, CBL, CCU and CCL carrying values corresponding to state values $V_1$="100," $V_2$="110" and $V_7$="111" as discussed above). The monitoring of a zero crossing condition monitors for a zero crossing condition in an electrical current flowing between the inverter and the phase b terminal of the motor. The second center null timing sequence defines a second predetermined sequence (e.g., (c) in FIG. 5) of sets of control signals. This example of a change occurs when the commanded voltage vector (FIG. 2) changes from the first sector to the second sector (see FIG. 3). Similar changes occur as the voltage vector rotates around the circle (FIG. 2).

In a first variant of the first example, the first center null timing sequence (e.g., (b) in FIG. 4) includes an inactive state (e.g., $V_7$="111") in which the corresponding set of control signals causes all terminals of the motor to be connected through the inverter to a first bus (e.g., the upper bus, FIG. 1). Also, the changing selects the second center null timing sequence (e.g., (c) in FIG. 5) to be a sequence that includes an inactive state (e.g., $V_0$="000") in which the corresponding set of control signals causes all terminals of the motor to be connected through the inverter to a second bus (e.g., the lower bus, FIG. 1) where the second bus is different than the second bus.

In a second variant of the first example, the method further includes computing a dwell time (e.g., $d_1$, $d_2$ and $d_z$, FIG. 10) for each state of the first center null timing sequence (e.g., (b) in FIG. 4) based on an input command CMD, and computing a dwell time for each state of the second center null timing sequence (e.g., (c) in FIG. 5) based on the input command CMD.

In a second example, an example of a machine-readable medium that includes sets of instructions operable in a controller for controlling an inverter (e.g., as depicted in FIG. 1) that uses sequences of predetermined states (e.g., vector voltages $V_0$ through $V_7$ as depicted in FIG. 3 and as discussed above) where each state uniquely corresponding to a set of control signals (e.g., CAU, CAL, CBU, CBL, CCU and CCL carrying values corresponding to state values "000" through "111" as discussed above) provided to the inverter that is coupled to a motor, the sets of instructions are operable to cause a processor in the controller to perform specific operation. Among these specific operations are repeatedly applying a first center null timing sequence (e.g., (b) in FIG. 4) of the states to sequentially provide to the inverter a first predetermined sequence of sets of control signals (e.g., CAU, CAL, CBU, CBL. CCU and CCL carrying values corresponding to state values $V_1$="100," $V_2$="110" and $V_7$="111" as discussed above). Also among these specific operations are instructions to monitor a zero crossing condition in an electrical current flowing between the inverter and the phase b terminal of the motor (e.g., when zero or nearly zero current is flowing between the inverter and the b phase of the motor). Further found among the specific operations is changing the repeated application of the first center null timing sequence (e.g., (b) in FIG. 4) into a repeated application of a second center null timing sequence (e.g., (c) in FIG. 5) of states when the monitoring detects a zero crossing condition where the second center null timing sequence defining a second predetermined sequence of sets of control signals. This example of a change occurs when the commanded voltage vector (FIG. 2) changes from the first sector to the second sector (see FIG. 3). Similar changes occur as the voltage vector rotates around the circle (FIG. 2).

In a first variant of the second example, the firs center null timing sequence (e.g., (b) in FIG. 4) includes an inactive state (e.g., $V_7$="111") in which the corresponding set of control signals causes all terminals of the motor to be connected through the inverter to a first bus (e.g., the upper bus, FIG. 1). Also, the set of instructions operable to cause the processor to perform the changing operation causes the processor to perform the changing operation in such a way as to select the second center null timing sequence (e.g., (c) in FIG. 5) to be a sequence that includes an inactive state (e.g., $V_0$="000") in which the corresponding set of control signals causes all terminals of the motor to be connected through the inverter to a second bus (e.g., the lower bus, FIG. 1) where the second bus is different than the second bus.

In a first variant of the second example, the sets of instructions are further operable to cause the processor to perform additional operations. The additional operations include computing a dwell time (e.g., $d_1$, $d_2$ and $d_z$, FIG. 10) for each state of the first center null timing sequence (e.g., (b) in FIG. 4) based on an input command CMD, and computing a dwell time (e.g., $d_1$, $d_2$ and $d_z$, FIG. 10) for each state of the second center null timing sequence (e.g., (c) in FIG. 5) based on the input command CMD.

Having described preferred embodiments of a novel PWM pattern sequence to reduce losses in voltage source inverters (which are intended to be illustrative and not limiting), it is noted that modifications and variations can be made by persons skilled in the art in light of the above teachings. It is therefore to be understood that changes may be made in the particular embodiments of the invention disclosed which are within the scope of the invention as defined by the appended claims.

Having thus described the invention with the details and particularity required by the patent laws, what is claimed and desired protected by Letters Patent is set forth in the appended claims.

What is claimed is:

1. A method for controlling an inverter using sequences of predetermined states, each state uniquely corresponding to a set of control signals provided to the inverter that is coupled to a motor, the method comprising:

repeatedly applying a first center null timing sequence of the states to sequentially provide to the inverter a first predetermined sequence of sets of control signals;

monitoring a zero crossing condition in an electrical current flowing between the inverter and a terminal of the motor; and changing the repeated application of the first center null timing sequence into a repeated application of a second center null timing sequence of states when the monitoring detects a zero crossing condition, the second center null timing sequence defining a second predetermined sequence of sets of control signals.

2. A method according to claim 1, wherein:

the first center null timing sequence includes an inactive state in which the corresponding set of control signals causes all terminals of the motor to be connected through the inverter to a first bus; and the changing selects the second center null timing sequence to be a sequence that includes an inactive state in which the corresponding set of control signals causes all terminals of the motor to be connected through the inverter to a second bus where the second bus is different than the second bus.

3. A method according to claim 1, further comprising:

computing a dwell time for each state of the first center null timing sequence based on an input command; and computing a dwell time for each state of the second center null timing sequence based on the input command.

4. A machine-readable medium comprising sets of instructions operable in a controller for controlling an inverter that uses sequences of predetermined states, each state uniquely corresponding to a set of control signals provided to the inverter that is coupled to a motor, the controller comprising a processor, the sets of instructions operable to cause the processor to perform operations comprising:

repeatedly applying a first center null timing sequence of the states to sequentially provide to the inverter a first predetermined sequence of sets of control signals;

monitoring a zero crossing condition in an electrical current flowing between the inverter and a terminal of the motor; and changing the repeated application of the first center null timing sequence into a repeated application of a second center null timing sequence of states when the monitoring detects a zero crossing condition, the second center null timing sequence defining a second predetermined sequence of sets of control signals.

5. A medium according to claim 4, wherein:

the first center null timing sequence includes an inactive state in which the corresponding set of control signals causes all terminals of the motor to be connected through the inverter to a first bus; and the set of instructions operable to cause the processor to perform the changing operation causes the processor to perform the changing operation in such a way as to select the second center null timing sequence to be a sequence that includes an inactive state in which the corresponding set of control signals causes all terminals of the motor to be connected through the inverter to a second bus where the second bus is different than the second bus.

6. A medium according to claim 4, wherein the sets of instructions are further operable to cause the processor to perform additional operations comprising:

computing a dwell time for each state of the first center null timing sequence based on an input command; and computing a dwell time for each state of the second center null timing sequence based on the input command.

* * * * *